United States Patent
Yamada et al.

(10) Patent No.: US 10,549,684 B2
(45) Date of Patent: Feb. 4, 2020

(54) SKIN MATERIAL FOR VEHICLE INTERIOR

(71) Applicants: TOYOTA BOSHOKU KABUSHIKI KAISHA, Aichi-ken (JP); DAIKI CO., LTD., Fukui-ken (JP)

(72) Inventors: Takamasa Yamada, Aichi-ken (JP); Seiji Chaza, Aichi-ken (JP); Shingo Okahara, Aichi-ken (JP); Mitsutaka Sakoh, Aichi-ken (JP); Hideo Kanamori, Aichi-ken (JP); Atsuhiko Ito, Aichi-ken (JP); Takayoshi Yamamoto, Fukui-ken (JP)

(73) Assignees: TOYOTA BOSHOKU KABUSHIKI KAISHA, Aichi-Ken (JP); DAIKI CO., LTD., Fukui-Ken (JP)

(*) Notice: Subject to any disclaimer, the term of this patent is extended or adjusted under 35 U.S.C. 154(b) by 234 days.

(21) Appl. No.: 15/466,100

(22) Filed: Mar. 22, 2017

(65) Prior Publication Data
US 2017/0297484 A1   Oct. 19, 2017

(30) Foreign Application Priority Data
Apr. 18, 2016   (JP) .................... 2016-082982

(51) Int. Cl.
*B60Q 3/217* (2017.01)
*B60Q 3/54* (2017.01)
(Continued)

(52) U.S. Cl.
CPC .............. *B60Q 3/217* (2017.02); *B60Q 3/54* (2017.02); *B60Q 3/62* (2017.02); *G02B 6/001* (2013.01);
(Continued)

(58) Field of Classification Search
CPC .. B60Q 3/217; B60Q 3/54; B60Q 3/52; B60R 13/0243; G02B 6/001
See application file for complete search history.

(56) References Cited

U.S. PATENT DOCUMENTS

| | | | |
|---|---|---|---|
| 2003/0156426 A1* | 8/2003 | Givoletti | B60R 13/02 362/556 |
| 2004/0037091 A1 | 2/2004 | Guy | |

(Continued)

FOREIGN PATENT DOCUMENTS

| | | |
|---|---|---|
| CN | 104428457 | 3/2015 |
| JP | S59-165620 | 9/1984 |

(Continued)

OTHER PUBLICATIONS https://www.britannica.com/science/polymethyl-methacrylate, accessed on Jan. 7, 2019, wayback machine confirms 2015 original publishing date. (Year: 2015).*

(Continued)

*Primary Examiner* — Robert J May
*Assistant Examiner* — Leah Simone Macchiarolo
(74) *Attorney, Agent, or Firm* — Greenblum & Bernstein, P.L.C.

(57) ABSTRACT

A skin material for vehicle interior includes a woven fabric woven by using a side emission type optical fiber and a multifilament as warp or weft, and is joined to a substrate for vehicle interior to constitute a vehicle interior material. In a surface of the woven fabric which constitutes the inside of a vehicle compartment, a virtual surface constituted by connecting side surfaces, on the inside of the vehicle compartment, of the side emission type optical fibers is in close vicinity to the substrate for vehicle interior, as compared with a virtual surface constituted by connecting side surfaces, on the inside of the vehicle compartment, of the multifilaments. Examples of the vehicle interior material in (Continued)

which the skin material for vehicle interior is used include door trims and roof trims.

9 Claims, 5 Drawing Sheets

(51) Int. Cl.
    *B60Q 3/62*     (2017.01)
    *F21V 8/00*     (2006.01)
    *B60R 13/02*     (2006.01)

(52) U.S. Cl.
    CPC ...... *B60Q 2500/10* (2013.01); *B60R 13/0243* (2013.01)

(56) References Cited

U.S. PATENT DOCUMENTS

| | | | |
|---|---|---|---|
| 2005/0223464 A1* | 10/2005 | Huang | A41D 13/01 2/102 |
| 2005/0252568 A1 | 11/2005 | Huang et al. | |
| 2006/0087864 A1* | 4/2006 | Peng | B60Q 1/56 362/554 |
| 2006/0144460 A1* | 7/2006 | Brochier | D03D 15/00 139/420 C |
| 2009/0291606 A1 | 11/2009 | Malhomme et al. | |
| 2014/0211498 A1* | 7/2014 | Cannon | B60Q 3/54 362/555 |
| 2015/0177436 A1 | 6/2015 | Zimmermann et al. | |
| 2017/0217366 A1* | 8/2017 | Kraemer | B60Q 3/54 |
| 2017/0261670 A1* | 9/2017 | Yamada | G02B 6/0008 |
| 2017/0342608 A1* | 11/2017 | Yamada | D03D 15/0094 |
| 2017/0343736 A1* | 11/2017 | Yamada | G02B 6/001 |
| 2018/0297515 A1* | 10/2018 | Laluet | B32B 17/067 |
| 2018/0339650 A1* | 11/2018 | Yamada | D03D 15/0094 |
| 2018/0340684 A1* | 11/2018 | Yamada | D03D 15/00 |

FOREIGN PATENT DOCUMENTS

| | | |
|---|---|---|
| JP | 2006-039287 | 2/2006 |
| JP | 2010-267573 | 11/2010 |
| JP | 2012-228921 | 11/2012 |
| WO | 2008/125339 | 10/2008 |
| WO | 2015/190920 | 12/2015 |
| WO | 2016/035502 | 3/2016 |

OTHER PUBLICATIONS http://www.premierplasticresins.com/pc-abs-natural-1500-lb-gaylord. html, accessed on Jan. 7, 2019, wayback machine confirms 2015 original publishing date. (Year: 2015).*

Chinese Office Action for CN App. No. 201710233367.1 dated May 25, 2018, along with English-language translation thereof.

Japan Office Action conducted in counterpart Japan Appln. No. 2016-082982 (dated Aug. 27, 2019) (w/ machine translation).

* cited by examiner

US 10,549,684 B2

SKIN MATERIAL FOR VEHICLE INTERIOR

CROSS-REFERENCE TO RELATED APPLICATIONS

The present application claims priority under 35 U.S.C. § 119 of Japanese Application No. 2016-82982 filed on Apr. 18, 2016, the disclosure of which is expressly incorporated by reference herein in its entirety.

1. Technical Field

The present invention relates to a skin material for vehicle interior woven by using a side emission type optical fiber and a multifilament and used as an illumination in vehicle compartments.

2. Related Art

The use of optical fibers is expanding in technical fields of optical communication and the like along with popularization of the Internet and the like. Based on the feature of optical fibers that they can guide light made incident from one end to the other end for light transmission, the optical fibers are used also in applications including, for example, various illuminations and displays. For example, there are known optical fibers having a core layer including an acrylic resin as the main ingredient and a fabric including the optical fibers, the optical fibers and fabric being useful, for example, as automobile accessories such as interior decoration goods, wherein damage inflicted to the core layer is suppressed; wherein a clad layer has been removed; and wherein an exposure position thereof is precisely processed (for example, see JP 2006-39287 A).

Also, there is known an optical fiber woven fabric including an optical fiber woven fabric including optical fibers and normal yarns woven as warps or wefts and a light source delivering light to at least one end part of the optical fibers, the optical fiber woven fabric functioning as an illumination device which allows for entrance of light from the light source into the optical fibers, and thus can be utilized as automobile interior parts such as door trims and small parts (for example, see JP 2010-267573 A). This literature explains that uneven light emission of the optical fiber woven fabric can be reduced by regularly weaving the optical fibers and the normal yarns in this optical fiber woven fabric to control the woven texture and emission luminance to be in predetermined states.

Further, there has hitherto been known an illumination in a vehicle compartment which delivers light from a light source such as a light guide rod 3 to a skin material 10a for a vehicle interior material such as a door trim 10 and which utilizes indirect light, which is reflected light thereof, as an illumination. The door trim 10 includes, on an upper end part side thereof, an ornament part 21 in a form bulging to the vehicle compartment side, and, additionally, is provided with an armrest 4, a door pocket 5, a speaker grille 6, and the like (see FIG. 4). For example, the light guide rod 3 can be arranged inside the ornament part 21 to deliver light to the skin material 10a, so that the reflected light from the skin material 10a can be used as an illumination in a vehicle compartment (see FIG. 5).

SUMMARY

Although the damage inflicted to the core layer is suppressed in the fabric described in JP 2006-39287 A, the optical fibers are processed to remove the clad layer. The removal of a clad layer is difficult when optical fibers are woven before processing, and it is not easy to weave optical fibers after processing to prepare a fabric. Also, the processing of removing the clad layer of the optical fibers to expose the core layer itself is not preferred. Further, in the optical fiber woven fabric described in JP 2010-267573 A, uneven light emission can possibly be reduced by controlling the woven texture and emission luminance to be in predetermined states. JP 2010-267573 A, however, nowhere mentions that, when the woven fabric is used in an illumination in a vehicle compartment, light might be reflected, for example, in windrow glass due to light diffusion.

Also, in a conventional form using, for example, a light guide rod as described above, it is necessary to adopt a form such that the light guide rod 3 is covered and masked and that light is delivered toward the skin material 10a positioned below. Therefore, the following problems arise: complicated structure and unfavorable appearance due to the ornament part 21 bulging more to the vehicle compartment side. Also, the light delivered to the skin material 10a (see the solid arrow which represents a light path of the delivered light in FIG. 5) and reflected diffuses and has no directionality (see the dashed arrow which represents a light path of the reflected light in FIG. 5), and thus is easily reflected, for example, in window glass positioned above, so that the illumination in a vehicle compartment would fail to offer a relaxed atmosphere.

The present invention has been made in light of the above-mentioned conventional techniques, and an object thereof is to provide a skin material for vehicle interior (hereinafter sometimes abbreviated as "skin material"), which is woven by using a side emission type optical fiber and a multifilament and used as a skin material for a vehicle interior material such as a door trim, and can function as an illumination in a vehicle compartment.

In order to solve this problem, a first aspect of the invention is directed to a skin material for vehicle interior, which is joined to a substrate for vehicle interior made of a resin, the skin material for vehicle interior including a woven fabric woven by using a side emission type optical fiber and a multifilament as warp or weft, wherein, in a surface of the woven fabric which constitutes the inside of a vehicle compartment, a virtual surface constituted by connecting side surfaces, on the inside of the vehicle compartment, of the side emission type optical fibers is in close vicinity to the substrate for vehicle interior, as compared with a virtual surface constituted by connecting side surfaces, on the inside of the vehicle compartment, of the multifilaments.

A second aspect of the invention is directed to the skin material for vehicle interior according to the first aspect, wherein the side emission type optical fibers are optical fibers made of a resin.

A third aspect of the invention is directed to the skin material for vehicle interior according to the first or second aspect, which is heated to shrink, and thereafter joined to the substrate for vehicle interior.

A fourth aspect of the invention is directed to the skin material for vehicle interior according to any one of the first to third aspects, wherein a vehicle interior material obtained by joining the skin material for vehicle interior to the substrate for vehicle interior is a door trim.

A fifth aspect of the invention is directed to the skin material for vehicle interior according to the fourth aspect, which is arranged so that the optical fibers made of a resin are aligned in the vehicle longitudinal direction of the door trim.

In the skin material for vehicle interior according to the present invention, in a surface of the woven fabric which constitutes the inside of a vehicle compartment, a virtual surface constituted by connecting side surfaces, on the inside of the vehicle compartment, of the side emission type optical fibers is in close vicinity to the substrate for vehicle interior, as compared with a virtual surface constituted by connecting side surfaces, on the inside of the vehicle compartment, of the multifilaments. Therefore, when light is guided to the side emission type optical fibers, the light path is interrupted by adjacent multifilaments, thereby making it possible to impart the directionality to the light. Thus, light diffusion is reduced, so that the reflection in window glass or the like is suppressed. Also, the side emission type optical fibers are positioned inward relative to the multifilaments, and are not exposed to the outer surface of the skin material, thereby making it possible to prevent the optical fibers from being scratched upon contact with passengers and other articles. Further, it is unnecessary to provide a step for covering and masking the light source in the interior material as in conventional vehicle compartment illuminations using a light source such as a light guide rod, so that a simple structure can be attained.

Also, when the side emission type optical fibers are optical fibers made of a resin, there can be obtained a skin material which can be easily woven, is flexible and has excellent bending impact and the like.

Further, when the skin material is heated to shrink, and thereafter joined to the substrate for vehicle interior, the multifilaments shrink more greatly in the length direction as compared with the side emission type optical fibers, and are increased in diameter radially, thereby making it possible to easily position the side emission type optical fibers inward in the skin material, to reduce light diffusion and to prevent the side emission type optical fibers from being scratched.

Also, when the vehicle interior material in which the skin material for vehicle interior is joined to the substrate for vehicle interior is a door trim, it is unnecessary to provide a large step for covering and masking the light source in the ornament part, so that the door trim can attain a simple structure and a good appearance, and that the reflection of diffused light in window glass or the like is also suppressed.

Further, when the skin material for vehicle interior is arranged so that the side emission type optical fibers are aligned in the vehicle longitudinal direction of the door trim, the reflection of light in window glass or the like due to light diffusion is suppressed more sufficiently, as compared with when the skin material for vehicle interior is arranged so that the side emission type optical fibers are aligned in the vehicle vertical direction.

DETAILED DESCRIPTION

Hereinafter, the present invention will be described in detail with reference to the drawings.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description is taken with the drawings making apparent to those skilled in the art how the forms of the present invention may be embodied in practice.

Figure 1:
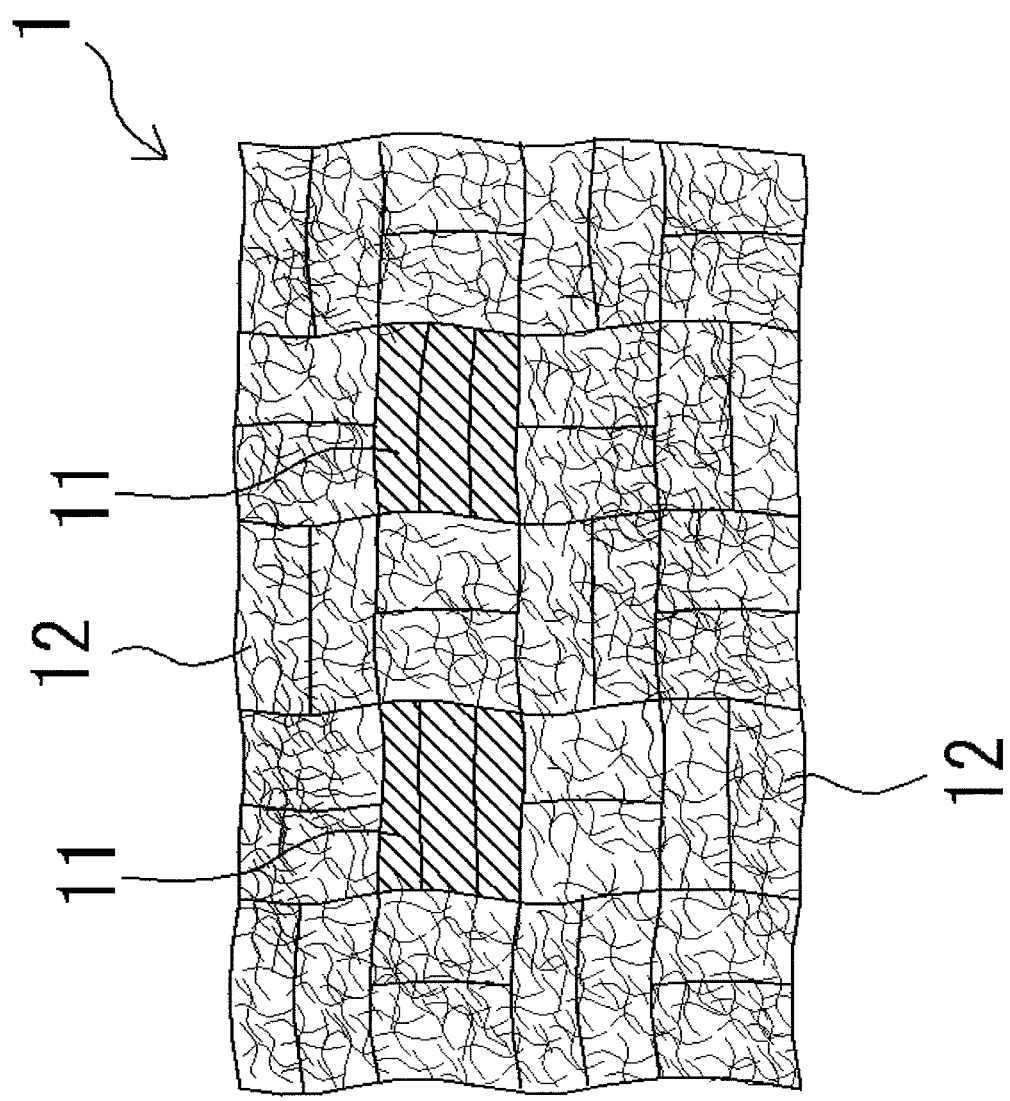
FIG. 1 is a schematic explanatory view showing one example of woven texture of a skin material for vehicle interior according to the present invention.
Figure 2:
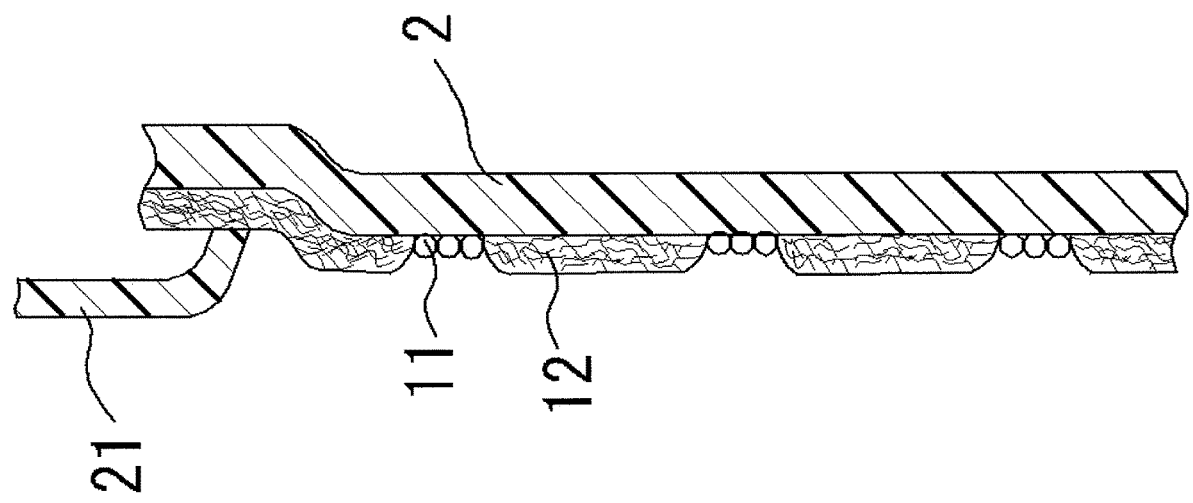
FIG. 2 is a schematic explanatory view of a part of a vehicle interior material (door trim) in which the skin material for vehicle interior in FIG. 1 is joined to a substrate for vehicle interior.

A skin material 1 for vehicle interior according to the present invention is joined to a substrate 2 for vehicle interior made of a resin, and also includes a woven fabric woven by using a side emission type optical fiber 11 and a multifilament 12 as warp or weft (see FIG. 1). In a surface of the woven fabric which constitutes the inside of a vehicle compartment, a virtual surface constituted by connecting side surfaces, on the inside of the vehicle compartment, of the side emission type optical fibers 11 is in close vicinity to the substrate 2 for vehicle interior, as compared with a virtual surface constituted by connecting side surfaces, on the inside of the vehicle compartment, of the multifilaments 12 (see FIG. 2).

The skin material 1 for vehicle interior (woven fabric) is woven by using the side emission type optical fibers 11 and the multifilaments 12 as warps or wefts. Whether the side emission type optical fibers 11 and the multifilaments 12 are woven as warps or wefts is not particularly limited, and can be set as appropriate, for example, depending on the types of the woven texture and loom used. The loom used for weaving the skin material 1 for vehicle interior (woven fabric) is not particularly limited, and examples thereof include a rapier loom (Models "G6500, R9500" manufactured by Itema Weaving Ltd. (Italy)), a jacquard loom (Models "CX880, DX110, LX1602, SXB" manufactured by STÄUBLI (France)) and a dobby loom (Model "UVIVAL500" manufactured by STÄUBLI (France)).

Also, the skin material 1 for vehicle interior is joined to the substrate 2 for vehicle interior to prepare a vehicle interior material such as a door trim. In a surface of the woven fabric which constitutes the inside of a vehicle compartment, a virtual surface constituted by connecting side surfaces, on the inside of the vehicle compartment, of the side emission type optical fibers 11 is in close vicinity to the substrate 2 for vehicle interior, as compared with a virtual surface constituted by connecting side surfaces, on the inside of the vehicle compartment, of the multifilaments 12. In brief, the materials appearing on the outermost surface, on the inside of the vehicle compartment, of the skin material 1 for vehicle interior are the multifilaments 12, and the side emission type optical fibers 11 do not appear on the outermost surface, and are woven at a deep position on the inner side of the skin material 1. In other words, the side emission type optical fibers 11 are positioned, as a whole, in closer vicinity to the substrate 2 for vehicle interior.

The side emission type optical fibers 11 can take a form such that they do not appear on the outermost surface of the skin material 1 and are woven at a deep position on the inner side, for example, based on the woven texture, such as double-woven texture or triple-woven texture, of the woven fabric woven by using the side emission type optical fibers 11 and the multifilaments 12, and also by controlling the yarn density.

Further, the appearing of the side emission type optical fibers 11 on the outermost surface, on the inside of the vehicle compartment, of the skin material 1 for vehicle interior can be prevented by decreasing the fineness of the side emission type optical fibers 11, for example, to ½ to ⅕, especially ⅓ to ⅕ of the fineness of the multifilaments 12. Hence, when the side emission type optical fibers 11 having small fineness are used, the fiber diameter of the multifilaments 12 would not be smaller than that of the side emission type optical fibers 11 even if the diameter of the multifilaments 12 is decreased by the tension applied during weaving, so that the side emission type optical fibers 11 would not appear on the outermost surface, on the inside of the vehicle compartment, of the skin material 1. Also, the appearing of the side emission type optical fibers 11 on the outermost surface of the skin material 1 can be prevented more effectively by considering the woven texture and yarn density as well as the functions and effects of small and large finenesses, respectively.

Also, a method of heating and shrinking the skin material 1 is indicated as another method for preventing the appearing of the side emission type optical fibers 11 on the outermost surface, on the inside of the vehicle compartment, of the skin material 1 for vehicle interior. In this case, the heating temperature and heating time are set so that the side emission type optical fibers 11, which are hard to shrink, would not shrink further and that the multifilaments 12 would shrink more greatly and be increased in diameter, in view of the differences, in material and tension applied during weaving, between the side emission type optical fibers 11 and the multifilaments 12, whereby the side emission type optical fibers 11 can be in a form such that they are woven at a deep position on the inner side of the skin material 1.

Figure 3:
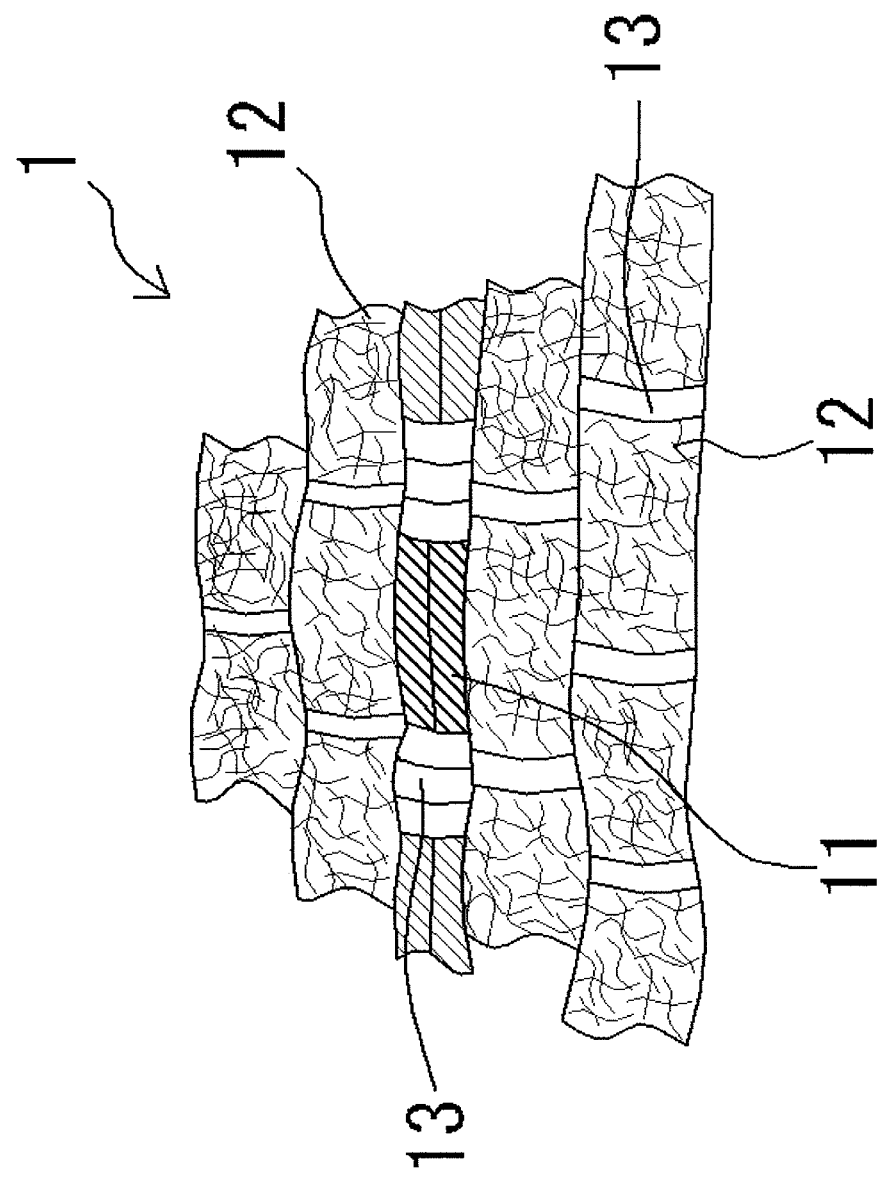
FIG. 3 is a schematic explanatory view showing the woven texture of the skin material for vehicle interior when multifilaments having small fineness are used.
Figure 4:
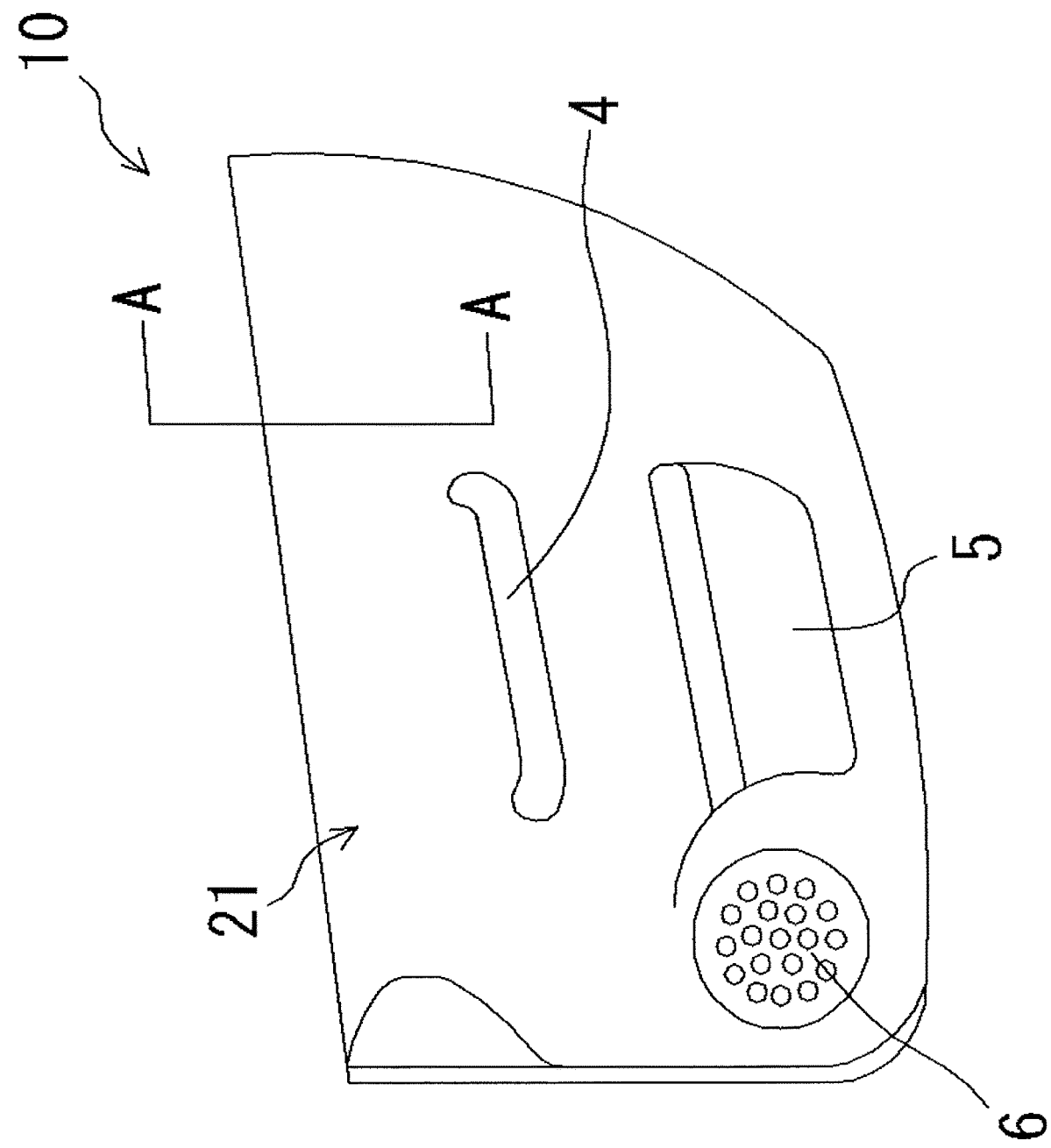
FIG. 4 is a schematic perspective view of a common door trim when viewed from the inside of a vehicle compartment.
Figure 5:
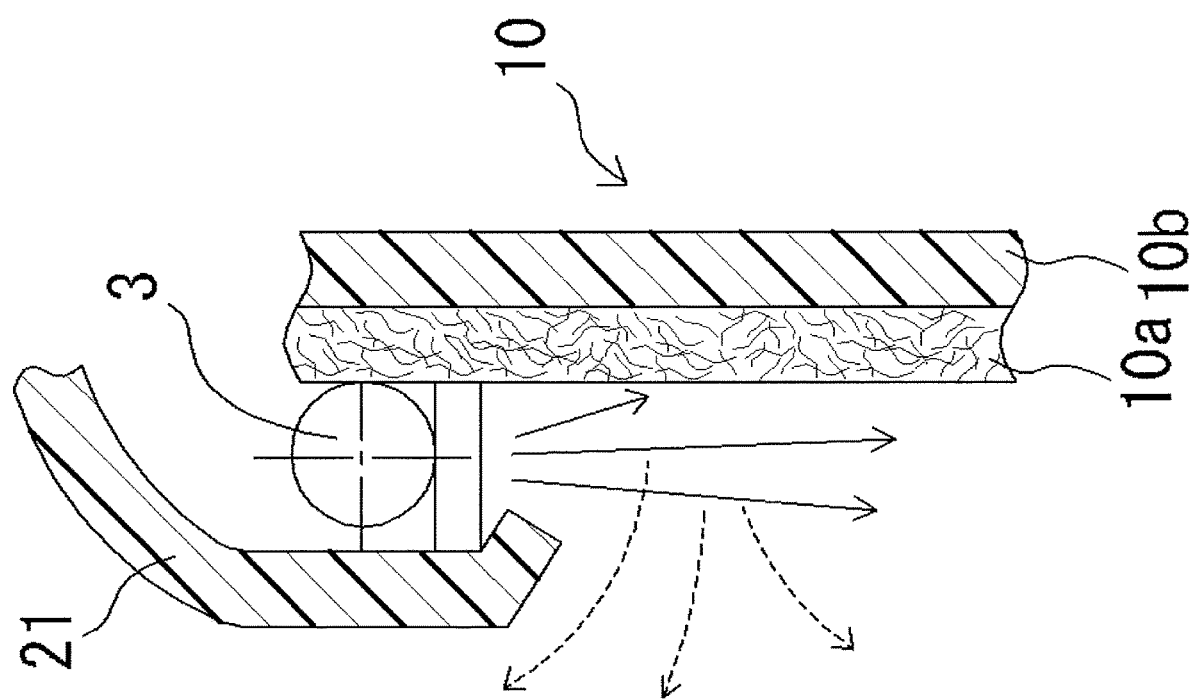
FIG. 5 is a schematic explanatory view of the A-A cross section of the door trim in FIG. 4.

Further, another example method for preventing the appearing of the side emission type optical fibers 11 on the outermost surface, on the inside of the vehicle compartment, of the skin material 1 for vehicle interior involves, during weaving, using as wefts the side emission type optical fibers 11 and the multifilaments 12 and also using as warps small-fineness multifilaments 13 for warps having fineness smaller than that of the multifilaments 12 to prepare a woven texture in which three to five small-fineness multifilaments 13 for warps are continuously woven in the weft direction in the side emission type optical fibers 11 and one small-fineness multifilament 13 for warp is woven in the weft direction in the multifilaments 12 (see FIG. 3). Thus, the side emission type optical fibers 11 can be woven so that they are positioned more inward in the skin material 1 by the small-fineness multifilaments 13 for warps.

Also, in order to prevent the side emission type optical fibers 11 from appearing on the outermost surface, on the inside of the vehicle compartment, of the skin material 1 for vehicle interior, it is possible to use as warps the side emission type optical fibers 11 and the multifilaments 12 and also use as wefts small-fineness multifilaments (13) for wefts having fineness smaller than that of the multifilaments 12, during weaving, to prepare a woven texture in which three to five small-fineness multifilaments (13) for wefts are continuously woven in the side emission type optical fibers 11 and one small-fineness multifilament (13) for weft is woven in the warp direction in the multifilaments 12. Thus, the function and effect which are similar to those described above are obtained.

Incidentally, although this form is not shown, a similar skin material can be obtained by interchanging warps and wefts in FIG. 3 (in the above descriptions, the small-fineness multifilaments for wefts have been explained using the same reference number as that of the small-fineness multifilaments for warps).

Further, the skin material 1 for vehicle interior can be used as a skin material for a vehicle interior material such as a door trim. In this case, the skin material 1 for vehicle interior is preferably arranged so that the side emission type optical fibers 11 are aligned in the vehicle longitudinal direction of the door trim 10 (see FIG. 2). Thus, the reflection in window glass or the like due to light diffusion can be suppressed more sufficiently, as compared with when the side emission type optical fibers 11 are aligned in the vehicle vertical direction of the door trim 10.

Optical fibers are normally composed of a core layer and a clad layer, and have a structure such that the outer periphery of the core layer is covered by the clad layer. They are configured so that, due to the difference in refractive index between the core layer and the clad layer, light entering the core layer is transmitted without leaking to the external. Also, the core layer and the clad layer may each be either a single layer or a laminate of a plurality of layers. Examples of the optical fibers include various optical fibers such as optical fibers made of a resin and quartz-based optical fibers. The optical fibers used in the present invention are woven in the woven fabric, and thus are preferably optical fibers made of a resin, which are flexible, have excellent bending impact and the like and can be easily woven.

While the side emission type optical fibers such as the existing optical fibers made of a resin have a diameter of about 0.1 to 10 mm, the side emission type optical fibers 11 having a diameter of 0.25 to 3 mm, especially 0.1 to 1 mm are preferably used from the viewpoint of easiness to weave, reduction of uneven light emission or general-purpose properties.

As the core layer of the optical fibers made of a resin, there are preferably used resins having excellent transparency: for example, acrylic resins such as polymethyl methacrylate, polyethyl methacrylate and polyethyl acrylate; polycarbonate resins; polystyrene resins; and polyolefin-based resins. Further, as the clad layer, there are preferably used resins having excellent transparency and a refractive index smaller than that of the core layer: for example, vinylidene fluoride resins, vinylidene fluoride-tetrafluoroethylene copolymer resins, polychlorotrifluoroethylene resins and trifluoroisopropyl methacrylate resins.

Also, multifilaments made of a synthetic resin are used as the multifilaments 12, small-fineness multifilaments 13 for warps and small-fineness multifilaments (13) for wefts. The material for the multifilaments 12, 13 is not especially limited, and multifilaments 12, 13 made of various synthetic resins can be used. Examples of this synthetic resin include: polyamide-based resins such as nylon 6 and nylon 66; polyester-based resins such as polyethylene terephthalate, polybutylene terephthalate and polytrimethylene terephthalate; polyacrylic resins; and polyolefin-based resins such as polypropylene. As the synthetic resin, a polyamide-based resin and a polyester-based resin are especially preferred.

Further, the fineness of the multifilaments 12 is not especially limited, but is preferably 60 to 1100 dtex, especially preferably 160 to 1100 dtex in order to prevent the side emission type optical fibers 11 from appearing on the outermost surface, on the inside of the vehicle compartment, of the skin material 1 for vehicle interior. Also, the fineness of the small-fineness multifilaments 13 for warps and small-fineness multifilaments (13) for wefts has only to be smaller than that of the multifilaments 12, and small-fineness multifilaments having appropriate fineness may be used, for example, in view of the position of the side emission type optical fibers 11 in the thickness direction of the skin material 1.

Also, the substrate 2 for vehicle interior is normally a molded body made of a synthetic resin, and molded into a shape of a vehicle interior material such as a door trim or a roof trim by a press-molding method involving heating and pressurization by means of a molding die. Also, the synthetic resin is not especially limited, and polyolefin resins such as polyethylene and polypropylene and polyamide resins such as nylon 6 and nylon 66 are used. Among these synthetic resins, polypropylene is preferred from the viewpoint of easiness to mold, strength and the like. Also, a fiber reinforced resin including glass fiber, carbon fiber or the like can be used in order to improve the physical properties such as rigidity.

Further, in order to allow the side emission type optical fibers 11 woven in the skin material 1 for vehicle interior to emit light, the tip end parts of a plurality of side emission type optical fibers 11 are bundled together, and a light source is arranged at a position facing their end surfaces. The light source is not especially limited, but LED is normally used. Light is delivered and guided from the LED light source toward the end surfaces of the side emission type optical fibers 11 bundled together, so that the side emission type optical fibers 11 emit light. Also, when the tip end parts of the plurality of side emission type optical fibers 11 are bundled together, all the side emission type optical fibers 11 woven in the skin material 1 for vehicle interior may be bunded together, if possible, depending on the shape and dimensions (area) of the skin material 1 for vehicle interior. Alternatively, a plurality of side emission type optical fiber 11 bundles in which a predetermined number of the side emission type optical fibers 11 are bundled together may be employed.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention can be utilized in the technical field of skin materials for vehicle interior, which are joined to a substrate for vehicle interior and can be utilized as indirect illuminations in vehicle compartments. Especially, the present invention is useful in the technical field of skin materials for vehicle interior materials such as a door trim and a roof trim.

What is claimed is:

1. A skin material for a vehicle interior, the skin material being joined to a substrate for a vehicle interior made of a resin,
    the skin material for a vehicle interior comprising a woven fabric woven by using a side emission type optical fiber and a multifilament as warp or weft,
    wherein the woven fabric is an outermost layer on the substrate so that a surface of the woven fabric is arranged inside of and open to a vehicle compartment in the vehicle interior, and
    wherein a virtual surface on the inside of the vehicle compartment of the side emission type optical fibers is in closer vicinity to the substrate for the vehicle interior, as compared with a virtual surface on the inside of the vehicle compartment of the multifilaments.

2. The skin material for a vehicle interior according to claim 1, wherein the side emission type optical fibers are optical fibers made of a resin.

3. The skin material for a vehicle interior according to claim 2, wherein a vehicle interior material obtained by joining the skin material for a vehicle interior to the substrate for a vehicle interior comprises a door trim.

4. The skin material for a vehicle interior according to claim 3, which is arranged so that the optical fibers made of a resin are aligned in the vehicle longitudinal direction of the door trim.

5. The skin material for a vehicle interior according to claim 1, wherein a vehicle interior material obtained by joining the skin material for a vehicle interior to the substrate for vehicle interior comprises a door trim.

6. The skin material for a vehicle interior according to claim 5, which is arranged so that the optical fibers made of a resin are aligned in the vehicle longitudinal direction of the door trim.

7. The skin material for a vehicle interior according to claim 1, which is heated to shrink, and thereafter joined to the substrate for a vehicle interior.

8. The skin material for a vehicle interior according to claim 7, wherein a vehicle interior material obtained by joining the skin material for a vehicle interior to the substrate for a vehicle interior comprises a door trim.

9. The skin material for a vehicle interior according to claim 8, which is arranged so that the optical fibers made of a resin are aligned in the vehicle longitudinal direction of the door trim.

\* \* \* \* \*